United States Patent [19]

Worrell

[11] 4,192,658
[45] Mar. 11, 1980

[54] PIPELINE FLAME ARRESTOR

[75] Inventor: G. Richard Worrell, Media, Pa.

[73] Assignee: Atlantic Richfield Company, Los Angeles, Calif.

[21] Appl. No.: 921,636

[22] Filed: Jul. 3, 1978

[51] Int. Cl.² .............................. F17D 1/02; F17D 1/04
[52] U.S. Cl. ........................................ 48/192; 137/334; 138/44; 165/1; 165/174; 165/DIG. 14
[58] Field of Search ..................... 48/190, 191, 192; 165/1, DIG. 14, 145, 174; 138/44, 38; 137/334; 220/88 R; 206/0.6

[56] References Cited

U.S. PATENT DOCUMENTS

| | | | |
|---|---|---|---|
| 1,259,029 | 3/1918 | Lucke | 48/192 |
| 1,887,093 | 11/1932 | Harnett et al. | 165/174 |
| 2,087,170 | 7/1937 | Stephenson | 48/192 |
| 2,602,647 | 7/1952 | Miller | 165/174 |
| 3,552,487 | 1/1971 | Tokumitsu et al. | 165/174 |
| 3,763,262 | 10/1972 | Sato et al. | 165/1 |
| 3,830,063 | 8/1974 | Morgan | 165/DIG. 14 |
| 4,078,292 | 3/1978 | Porter | 165/174 |

FOREIGN PATENT DOCUMENTS 764167 of 1934 France ........................... 48/192

*Primary Examiner*—S. Leon Bashore
*Assistant Examiner*—Peter F. Kratz
*Attorney, Agent, or Firm*—John R. Ewbank

[57] ABSTRACT

A flame arrestor directs the gas stream to flow through an array of narrow tubes immersed in a normally liquid heat transfer fluid. The gas composition flowing through the flame arrestor is normally maintained at the ambient temperature of such liquid. Even if a flame front enters either connection for the flame arrestor, the cooling effectively quenches the flame before the flame front can advance through the liquid-cooled narrow tubes to the other connector of the flame arrestor, because such a large amount of liquid must be evaporated before the flame arrestor can be heated above the boiling point of the liquid. At both the inlet and outlet zones, where there is a transition between the relatively large cross-sectional area of the array of tubes and the smaller pipes for connecting to the pipeline, a hollow, liquid-cooled member serves as an internal baffle for such transition zone. The gas velocity through the transition zone is thus maintained about as fast as in the pipeline, thus decreasing the likelihood of a slow-moving flame front. Moreover, no hot spots can develop in the transition zone because of the liquid cooling therein.

1 Claim, 3 Drawing Figures

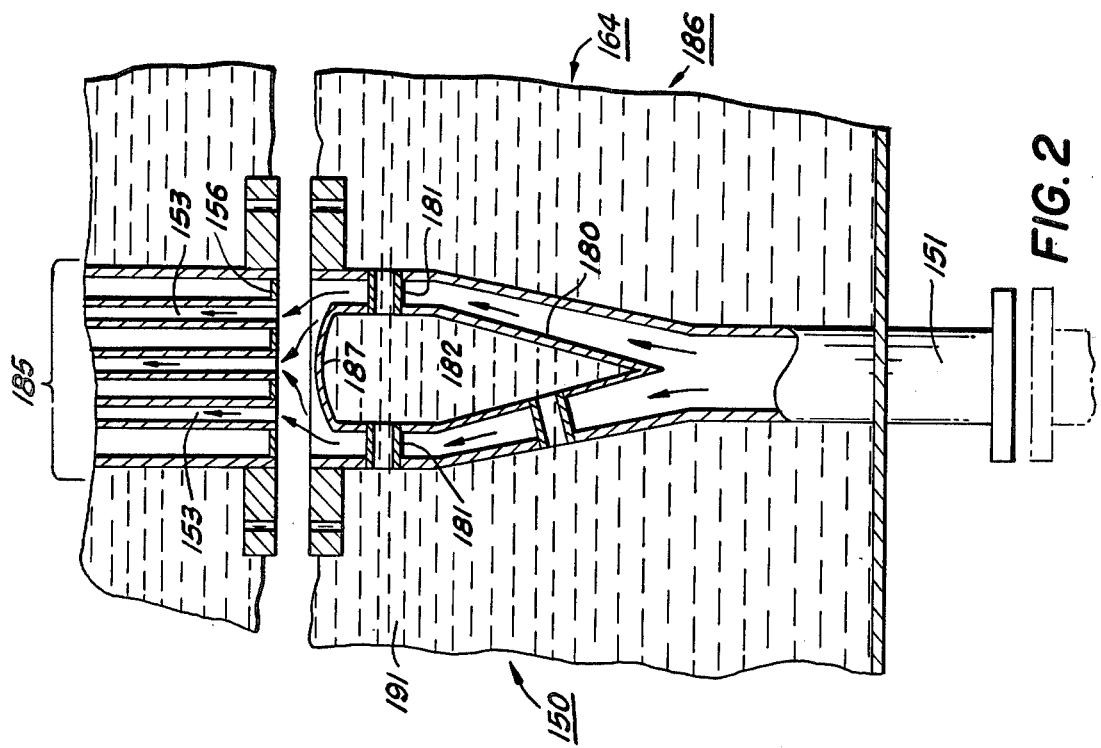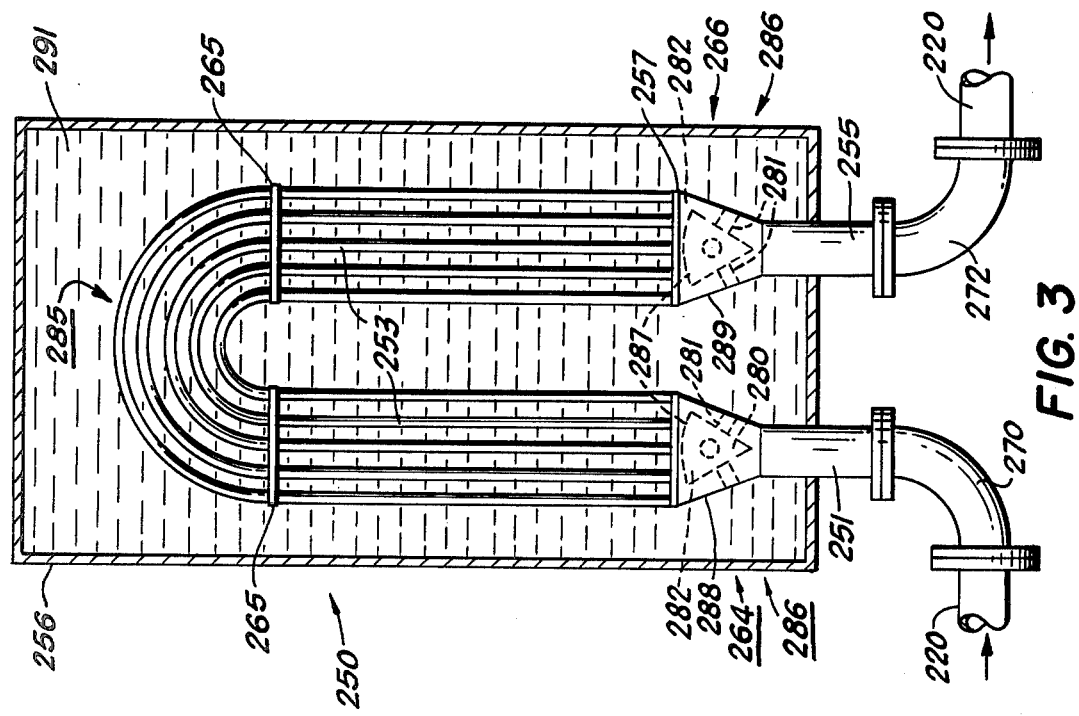

PIPELINE FLAME ARRESTOR

RELATED INVENTIONS

Reference is made to the application of G. R. Worrell and F. F. McKay, Ser. No. 860,791, filed Dec. 15, 1977, entitled REACTION BOUNDARY SUPPRESSOR SYSTEMS, all the disclosure of which is incorporated herein and deemed here reiterated. Reference is also made to the concurrently filed application of G. R. Worrel, entitled, FLAME ARRESTOR SYSTEMS FOR PIPELINES, Ser. No. 921,546, filed July 3, 1978, all the disclosure of which is incorporated herein and deemed here reiterated.

BACKGROUND OF INVENTION

1. Field of Invention

This invention relates to flame suppressors for gas pipelines.

2. PRIOR ART

A flame front of an undesired reaction may accidentally start to migrate through a pipeline system. The heat transfer conditions may be such that the flame will be quenched by the large amount of residual cooling of the combination of the environment and the pipeline, especially when the pipeline diameter is small. However, in other situations the pipeline may be relatively insulated. If the pipe diameter is large so that the total heat content of the flame front is great, then the pipeline may be heated to a temperature causing the rupture of the pipeline.

Inasmuch as ruptures of pipeline attributable to the advancement of a flame front are relatively rare, and inasmuch as the self-dissipation of a flame front can occur under a variety of conditions, there are a variety of engineering considerations tending to decrease the number of flame arrestors scheduled for installation merely to protect the long runs of a pipeline from rupture. However, the hazards inherent in permitting an advancing flame front to enter a gas processing facility, or a chemical plant, or a gas storage facility, are so serious that there is adequate economic justification for flame arrestors protecting substantially all facilities to which pipeline gas might be delivered, notwithstanding the infrequency of such accidents. If a flame front enters either end of a flame arrestor, the cooling is designed to be adequate to quench the flame before the flame front can advance to the other end of the flame arrestor. Moreover, the flame arrestor is advantageously designed to quench two flame front separator in time by less than an hour or only a few seconds.

Preferred embodiments of the invention of said Ser. No. 860,791 feature a deep pool of heat transfer liquid, in the a lower portion of which an array of heat transfer tubes serve to cool the divided gas stream flowing therethrough. Even if the one or more flame fronts involve significant heat, the cooling capacity of the liquid is sufficient to quench each flame front advancing into the reaction boundary suppressor system of said Ser. No. 860,791.

In the normal flow of gas, the provision of conical plenum zones is generally acceptable even though there are potentialities for relatively rapid changes in the cross-sectional area of a gas stream in the transition between systems having different cross-sectional areas. In research relating to the development of the flame arrestor of the present invention, the surprising discovery was made that flame front compositions and/or compositions closely approaching those of a flame front could undergo erratic modifications and stabilization was subjected to a large plenum. Such discovery during the development of the present invention was surprising inasmuch as many varieties of equipment had directed gas streams through appropriate plenums and zones of rapid change in the cross-sectional area without troublesome unreliability.

SUMMARY OF THE INVENTION

In accordance with the present invention, baffle means are positioned in each transition zone of a change between the large cross-sectional area of the array of tubes and the relatively smaller cross-sectional area of the connectors to the gas line, whereby the gas velocity throughout the transition zone is maintained fast enough to decrease propensities toward development of hot zones. Moreover, the baffle system is liquid cooled. A hollow baffle, partaking of the nature of a conical shape if the array has a generally cylindrical shape, cooperates with a conical wall encompassing the gas stream in such liquid cooling. Hollow pipes connect the interior of the baffle with the pool in the vat of the flame suppressor, so that the liquid inside the baffle participates in the liquid circulation of the pool.

DESCRIPTION OF DRAWINGS

In the accompanying drawings,

FIG. 2 is a schematic showing of a liquid-cooled surface adapted to maintain the velocity of a gas stream during its transition between the relatively large cross-sectional area of the array of tubes and the relatively small cross-sectional area of the connectors to the pipeline.

FIG. 3 is a schematic cross-sectional flow of a flame arrestor incorporating both the return loop and the maintenance of the velocity of the gas flowing through the zone of area transition.

Figure 1:
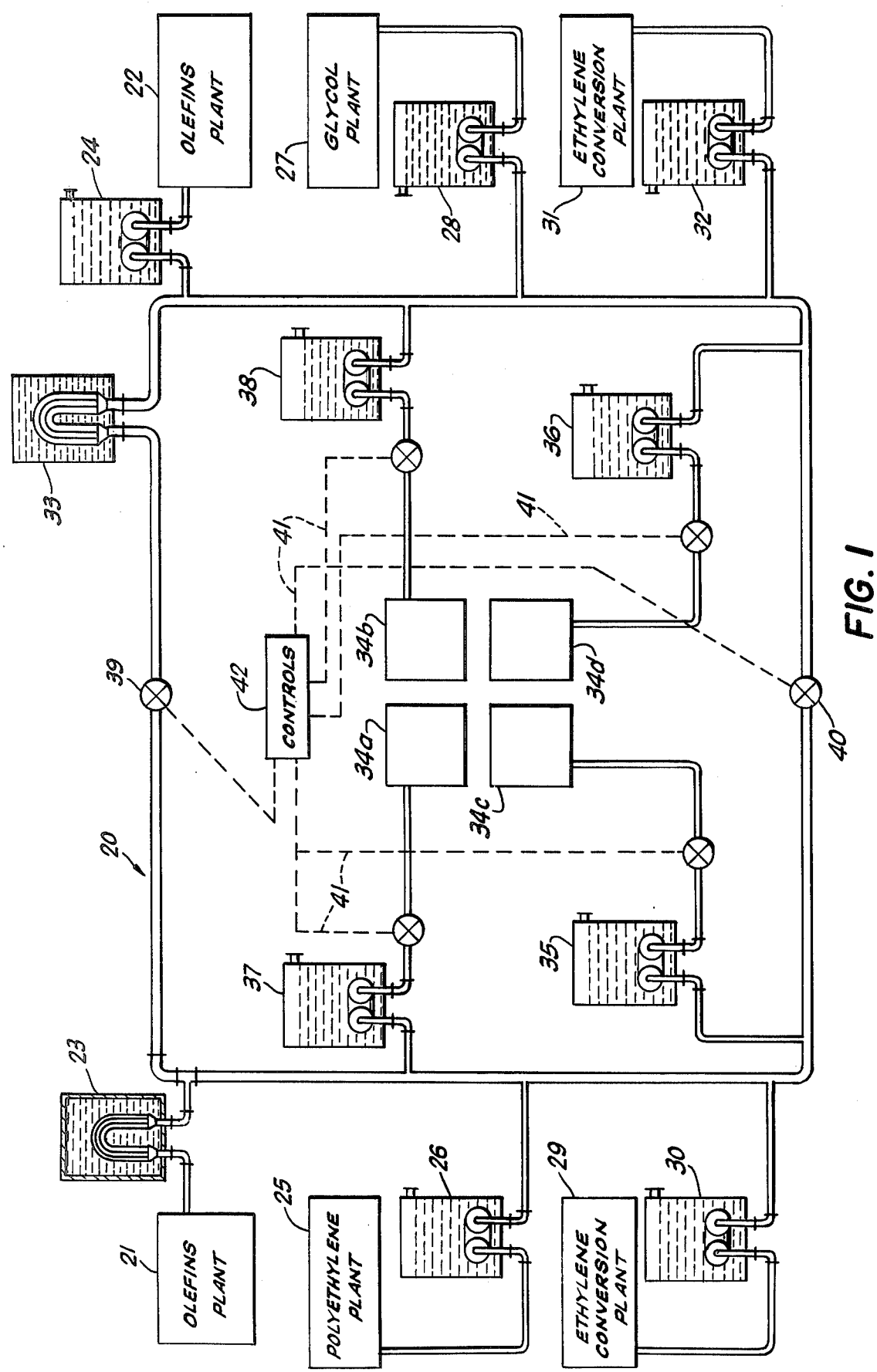
FIG. 1 is a schematic drawing of a pipeline system having a flame arrestor protecting each of a plurality of facilities to which the gas is delivered.

The invention is further clarified by reference to some illustrated embodiments and by a general description.

ILLUSTRATIVE EMBODIMENTS

As shown in FIG. 1, a pipeline system 20 is adapted to distribute a gas, such as ethylene, to a plurality of customers, including a polyethylene plant 25, glycol plant 27, and ethylene conversion plants 29, 31. Moreover, the pipeline system 20 is adapted to supply ethylene to or receive ethylene from a plurality of storage facilities 34a, 34b, 34c, and 34d. A plurality of ethylene generating facilities such as olefins plants 21, 22 can supply the ethylene. A plurality of valves, including valves 39 and 40, can permit flexible arrangements concerning the flow of the ethylene in the pipeline system. Communication lines 41 can transmit signals from sensors and/or transmit signals to valves so that the pipeline system can function in response to controls 42.

Pipeline systems of the general type thus far described have functioned for decades without the use of any flame suppressors. In the development of the present invention, it was discovered that a hazard exists by reason of the high temperature and significant heat generated by a reaction front for the decomposition of ethylene. As long as a single flame front is advancing rapidly, there is a reasonable possibility for the dissipation of the heat from the flame front at a rate which avoids rupture of the pipe. However, under adverse conditions a flame front may be near static, or moving at a rate which is slow enough that the pipe can be heated sufficiently to soften the pipe and weaken the pipe so that it ruptures. In order to minimize the likelihood of such rupture of a pipeline by an advancing flame front, a plurality of flame arrestors is desirably positioned in the pipeline system.

As shown in FIG. 1, a flame arrestor 33 can be positioned in a long line portion of the pipeline system 20. It is even more important that each of the facilities of customers, such as polyethylene plant 25, glycol plant 27, and ethylene conversion plants 29 and 31 be protected by flame arrestors 26, 28, 30, and 32 respectively. Of particular importance is the protection of storage facilities 34a, 34b, 34c, and 34d with flame arrestors 37, 38, 35, and 36 respectively. It is also worthwhile to protect olefins plants 21 and 22 with flame arrestors 23 and 24 respectively. Said Ser. No. 860,791 illustrates the above described placement of flame arrestors.

As shown in FIG. 2, an entry zone 164 of a flame arrestor is provided with an internal baffle 180, which is hollow so that heat transfer liquid 191 can flow from the principal pool 191 through supporting conduits 181 into a hollow interior 182 of baffle 180.

An important function of baffle 180 is that of controlling the speed of the gas stream in a transitional zone 186 between inlet pipe 151 and a cylindrical bundle 185 of heat transfer tubes 153. The cross-sectional area of the bundle 185 of heat transfer tubes is significantly larger than the cross-sectional area of the inlet pipe 151. Although it is necessary to distribute the gas stream from the inlet pipe 151 to the plurality of heat transfer tubes 153 by directing the gas stream through the transitional zone 186, it is important that the gas velocity be maintained at a speed near the speed of that in the entry pipe 151. If an advancing flame front is permitted to slow down enough to approach a static flame front, then the potentiality for adequate cooling and quenching of the flame front is significantly less. In the flame suppressor shown in the drawings of Ser. No. 860,791, a conventional plenum is provided in a transitional zone, and such plenum can function satisfactorily under a variety of favorable circumstances. However, in the development of the present invention, it was discovered that such plenum has a potential hazard of possibly slowing down the gas velocity in such a manner that the flame suppressor might be less reliable than desired. The gas velocity in heat transfer tubes 153 is often times of the magnitude of about twice the gas velocity in the pipeline and/or inlet tube 151. Even with such high gas velocity in the heat transfer tubes 153, the potentiality for a slowdown of the gas velocity in a plenum of an entry means 164 has been found undesirable.

FIG. 2 is a partially exploded view showing tube sheet 156 spaced from the baffle 180. Attention is called to a curved surface 187 which helps to distribute the gas stream evenly to the tubes in the outer annulus of the cylindrical bundle 185 as well as to the innermost tubes.

FIG. 3 is a schematic top-section view of a flame arrestor 250. An inlet pipe 251 of an inlet means 264 is connected by an elbow 270 to an upstream portion of a gas pipeline system 220. Similarly, an exit pipe 255 of an outlet means 266 is connected by an elbow 272 to a downstream portion of said gas pipeline system 220.

A cylindrical bundle 285 of heat transfer tubes 253 is shaped as a "U," so that it forms a return loop, thus permitting inlet and exit pipes 251, 255 to be closely adjacent, and thus permitting the flame arrestor 250 to be retrofitted into a pipeline at closely adjacent upstream and downstream portions. Supports 265 for the bundle 285 permit each tube 253 to undergo expansion and contraction without jeopardizing the structural integrity of the attachment of the ends of the tubes to tube sheets 257.

A conical wall 288 encompasses the gas stream while flowing from the relatively small cross-sectional area of inlet pipe 251 to the relatively larger cross-sectional area of the bundle 285 in the submerged transitional zone 286. Similarly, a conical wall 289 encompasses the gas stream while flowing from the large cross-sectional area of bundle 285 to the relatively smaller cross-sectional area of the exit pipe 255 in the submerged transitional zone 286.

In accordance with the present invention, each transitional zone 286 contains a baffle system 280 adapted to provide at most portions of such transition zone a gas velocity of the magnitude of the gas velocity in the pipeline system 220, and avoid any significant zone of quasi-stagnancy or very slow gas velocity. Supporting conduits 281 permit the liquid in the pool 291 to flow to and from a hollow portion 282 of baffle system 280, as well as to release any steam generated. A curved face 287 of baffle 280 provides uniform distribution of the gas to all of the tubes 253 of cylindrical bundle 285.

The flame arrestor 250 has many of the functional features of the flame arrestors of Ser. No. 860,791, including a vat 256 holding a pool of heat transfer liquid 291 normally maintained at about ambient temperature, but susceptible of being heated and evaporated while quenching one or more flame fronts.

Generally it is convenient to fabricate a hollow baffle to cool and regulate the gas velocity in a transitional zone 286. However, the baffle system can consist of an array of vertical conduits, or an array of horizontal conduits, or an array of conduits in different directions. The conduits, or bundles of heat transfer tubes, or other components can have a non-circular shape such as oval, hexagon, square, or triangular, the circular shape being convenient for some illustrations.

It should be noted that under very adverse conditions a portion of the gas exiting from a heat transfer tube might be only slightly below the spontaneous decomposition temperature, so that only a small amount of incremental heat might restart the highly exothermic reaction. Hence, the baffle system 280 in an exit means 266 is designed to maintain appropriate gas velocities without pulsing or other compressive phenomena which might heat some of the gas to the exothermic reaction temperature. Most of the effective cooling of the gas is in the heat transfer tubes 253, and not in the transitional zone 286. The liquid inside conduits 281 and baffle 280 prevents excessively hot spots from developing in the transitional zone 286, and it is this preventitive function, rather than gas cooling, which is emphasized.

Gas pipeline systems sometimes contain gas mixtures which are susceptible to an exothermic reaction which might spread from the scene of an accident, and the flame arrestors of the present invention could protect customers' facilities from an advancing flame front in a manner similar to the flame quenching for the ethylene decomposition reaction discussed herein.

In its broader aspects, the present invention can be described as apparatus for halting the advancement of flame fronts advancing thereto which apparatus consists of: an array of narrow tubes having a length of at least 1 meter and an internal diameter not greater than about 4 centimeters through which the gas stream is adapted to flow, there being relatively large zones for heat transfer liquid between adjacent tubes, whereby the cross section of the array of tubes is significantly larger than the cross section of the pipeline and connections thereto; structural means adapted normally to maintain the exterior of said array of narrow tubes submerged in a pool of liquid normally maintained at about ambient temperature, and adapted to cool the gas flowing within said array of tubes to a temperature below about 150° C., whereby in the event of the advancement of a flame front into one end of the array of narrow tubes the flame front is cooled and quenches to below reaction temperature before such flame front can advance to the other end of such tubes; liquid-cooled entry means directing gas flowing through an entry pipe associatable with an upstream portion of the gas pipeline into said array of tubes, the cross section of said array of tubes being significantly larger than the cross section of said entry pipe, said entry means comprising a wall encompassing the gas stream, the opposite side of said wall contacting said pool of liquid, and said entry means comprising a hollow baffle, there being hollow tubes connecting said hollow baffle with said wall, and permitting circulation of liquid between the interior of said baffle and said pool of liquid, whereby a plurality of liquid-cooled surfaces cools the gas stream flowing from the entry pipe toward the array of tubes; and liquid-cooled exit means directing gas flowing through said array of tubes into an exit pipe associatable with a downstream portion of the gas pipeline, the cross section of said array of tubes being significantly larger than the cross section of said exit pipe, said exit means comprising a wall encompassing the gas stream, the opposite side of said wall contacting said pool of liquid, and said exit means comprising a hollow baffle, there being hollow tubes connecting said hollow baffle with said wall, and permitting circulation of liquid between the interior of said baffle and said pool of liquid, whereby a plurality of liquid-cooled surfaces cools the gas stream flowing from the array of tubes toward said exit pipe.

Various modifications of the invention are possible without departing from the scope of the appended claims.

The invention claimed is:

1. Apparatus for halting the advancement of ethylene decomposition flame fronts advancing thereto which apparatus consists of:

an array of narrow tubes having a length of at least 1 meter and an internal diameter not greater than about 4 centimeters through which an ethylene gas stream flows, there being relatively large zones for heat transfer liquid between adjacent tubes, whereby the cross section of the array of tubes is significantly larger than the cross section of an ethylene pipeline with which said array of narrow tubes is connected, said pipeline being used for distributing ethylene to a plurality of customers;

structural means for maintaining the exterior of said array of narrow tubes submerged in a pool of heat transfer liquid normally maintained at about ambient temperature, and adapted to cool the ethylene gas flowing within said array of tubes to a temperature below about 150° C., whereby in the event of the advancement of a flame front into one end of the array of narrow tubes the flame front is cooled and quenched to below reaction temperature before such flame front can advance to the other end of such tubes;

liquid-cooled entry means directing gas flowing through an entry pipe connected to an upstream portion of said ethylene pipeline into said array of tubes, the cross section of said array of tubes being significantly larger than the cross section of said entry pipe, said entry means comprising a wall encompassing the gas stream, the opposite side of said wall contacting said pool of liquid, and said entry means comprising hollow baffle means, conduit means connected to said hollow baffle means and said pool of heat transfer liquid for circulating heat transfer liquid between the hollow of said baffle means and said pool of heat transfer liquid and said hollow baffle means being spaced from said wall encompassing the gas stream, said baffle means providing a cross-sectional area for gas flow maintaining the gas flow velocity at about the speed in the pipeline;

liquid-cooled exit means directing gas flowing through said array of tubes into an exit pipe connected to a downstream portion of said ethylene pipeline, the cross section of said array of tubes being significantly larger than the cross section of said exit pipe, said exit means comprising a wall encompassing the gas stream, the opposite side of said wall contacting said pool of liquid, and said exit means comprising hollow baffle means, conduit means connected to said hollow baffle means and said pool of heat transfer liquid for circulating heat transfer liquid between the hollow of said baffle means and said pool of heat transfer liquid and said hollow baffle means being spaced from said wall encompassing the gas stream, said baffle means providing a cross-sectional area for gas flow maintaining the gas flow velocity at about the speed in the pipeline.

* * * * *